United States Patent [19]

Wright

[11] Patent Number: 4,660,746

[45] Date of Patent: Apr. 28, 1987

[54] MOUTHWASH DISPENSER

[75] Inventor: David M. Wright, Evansville, Ind.

[73] Assignee: Sunbeam Plastics Corporation, Evansville, Ind.

[21] Appl. No.: 814,050

[22] Filed: Dec. 27, 1985

[51] Int. Cl.⁴ .............................................. B65D 37/00
[52] U.S. Cl. ................................... 222/207; 222/211; 222/212; 141/380
[58] Field of Search ...................... 222/207, 211, 212; 141/379–381, 328, 386

[56] References Cited

U.S. PATENT DOCUMENTS

| | | | |
|---|---|---|---|
| 2,164,172 | 6/1939 | Dalton | 141/379 X |
| 2,714,975 | 8/1955 | Greene | 222/207 X |
| 3,089,623 | 5/1963 | Padzieski | 222/207 X |
| 3,921,860 | 11/1975 | Zackheim | 222/207 |
| 4,077,547 | 3/1978 | Donoghue | 222/207 |
| 4,106,673 | 8/1978 | Donoghue | 222/207 |

FOREIGN PATENT DOCUMENTS 3241054 5/1984 Fed. Rep. of Germany ...... 222/207

Primary Examiner—Charles A. Marmor
Attorney, Agent, or Firm—Irvin L. Groh

[57] ABSTRACT

A liquid dispensing closure cap for application to a flexible wall container. The cap has a delivery tube extending downwardly into the container and upwardly in a pedestal above the cap top. A dosage cap is seated on the top of the cap. A closure lid is hinged to the pedestal for closing over the pedestal and dosage cap. A spout connects the upper end of the delivery tube to deliver liquid to the dosage cup as the container is squeezed. Closure of the lid prevents liquid delivery through the spout. The cup is removable from the cap and container for use, as where mouth wash is dispensed therein.

8 Claims, 10 Drawing Figures

MOUTHWASH DISPENSER

This invention relates to a dispensing closure, and, more particularly, to a closure cap adapted to be applied to a squeezable bottle for delivery of liquid from the container to a metering chamber associated with the cap.

There are a wide variety of liquid dispensing closures which are suitable for attachment to a flexible wall container to deliver liquid through a dip tube or delivery tube when the container is squeezed. A number of these liquid dispensing closures have a metering or dosage chamber attached to the closure cap for allowing the user to dispense a desired or predetermined amount of liquid therein to be poured out for use. Many of the dispensing closures having an integral metering chamber bring the dip tube from the container through the cap into the metering chamber to act as a stand pipe so that any excess liquid which is squeezed into the metering cup returns through the dip tube to the container when the squeezing pressure is released. This provides a convenient means of delivering a predetermined amount of liquid to the chamber. There are many different designs to control the flow of the liquid through the dip tube to the metering chamber.

It is the principle objective of this invention to provide a liquid dispensing closure for delivering a liquid to a removable metering chamber or dosage cup so that after filling, the cup may be removed for usage, such as a mouth wash cup or a cough syrup dispenser or on a larger scale a clothes washer detergent. The cup then may be rinsed before returning to the container cap for repeated use.

The foregoing purpose is accomplished in a liquid dispensing closure having a base cap and a dosage cup which can only be filled and removed when the lid is in an open position The base cap has a depending cylindrical skirt for attachment to the container and a pedestal extending upwardly from the top of the cap. A dosage cap is removably seated on the cap top contiguous with the pedestal. Preferably, the top of the cap is provided with a lip or upstanding rim which engages a recess from the bottom of the dosage cap.

The pedestal housing occupies a small portion of the cap area and has an upstanding outside wall portion which is flush with the cylindrical skirt of the base cap. The vertical wall of the dosage cup is contiguous or surrounds the housing wall within the cap area with the remainder of its vertical wall being flush with the cylindrical skirt wall so as to form with the outside portion of the pedestal wall a cylindrical extension of the base cap skirt. A closure lid is hingingly connected to the pedestal for closure over the dosage cap and contiguous pedestal.

A delivery tube extends downwardly from the cap top so that it will touch the bottom of the container. The tube extends upwardly from the cap top to the pedestal housing for delivery of the liquid from the container to the dosage cup.

A spout-valve member is attached to the upper end of the delivery tube and extends or spans over the pedestal housing wall and dosage cup wall to provide a dispensing orifice pointing downwardly into the dosage cup.

A valve post extends upwardly in the dosage cup and is aligned so that the outlet orifice is juxtapositioned over the end of the valve post to act as a shut-off valve.

A locking tab depends from the inside surface of the closure lid and is positioned to press against the spout-valve member when the lid is closed so that the orifice is pushed against the top of the valve post preventing delivery of liquid from the container. The top of the valve post and the orifice is suitably configured with conforming conical sealing surfaces. When the lid is raised, the spout-valve releases from the post creating a path for the liquid to flow through the delivery tube and spout over the post and into the dosage cup as the bottle is squeezed. The cup can then be removed for use.

The preferred embodiments of the invention are illustrated in the drawings in which.

Figure 1:
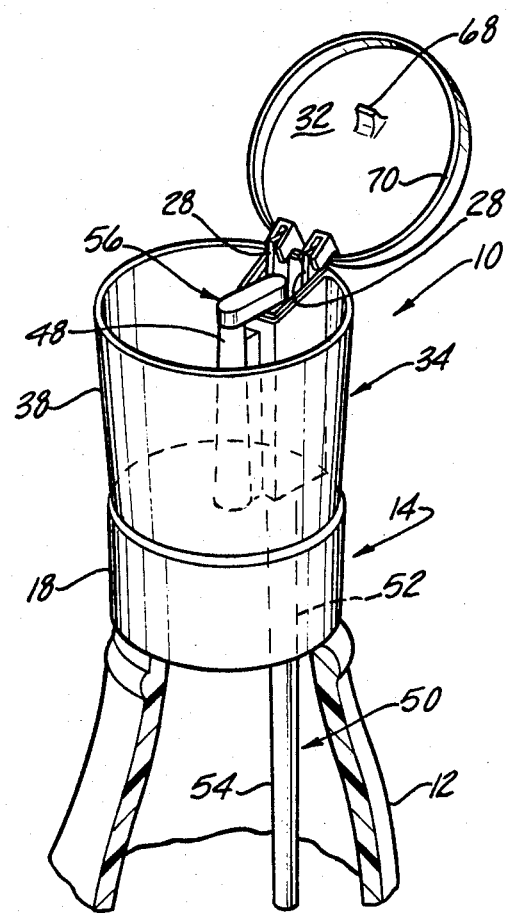
FIG. 1 is a perspective view showing the dispensing closure of this invention attached to a container having a delivery tube extending into the container. The dosage cup is shown seated on the cap with the hinge lid open providing a free flow path through the spout for delivery of liquid to the cup.
Figure 2:
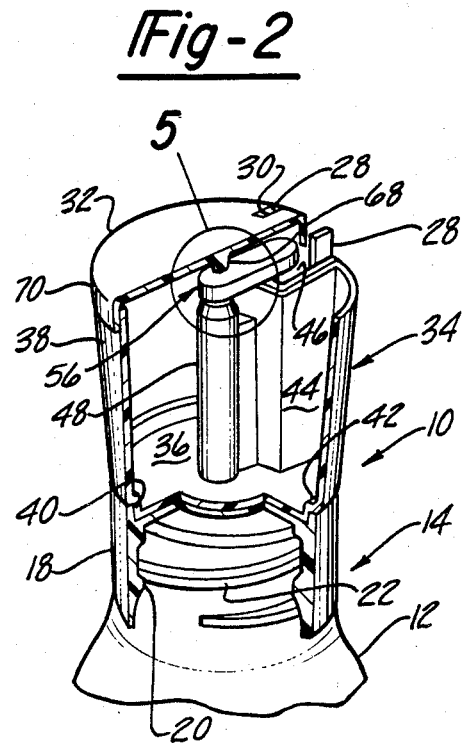
FIG. 2 is a perspective view similar to FIG. 1 with a portion cut-away to show in section the nesting relationship of the dosage cup with the base cap and the lid in its closed position with its depending locking tab pressing the spout-valve member into sealing relationship with its valve post.
Figure 3:
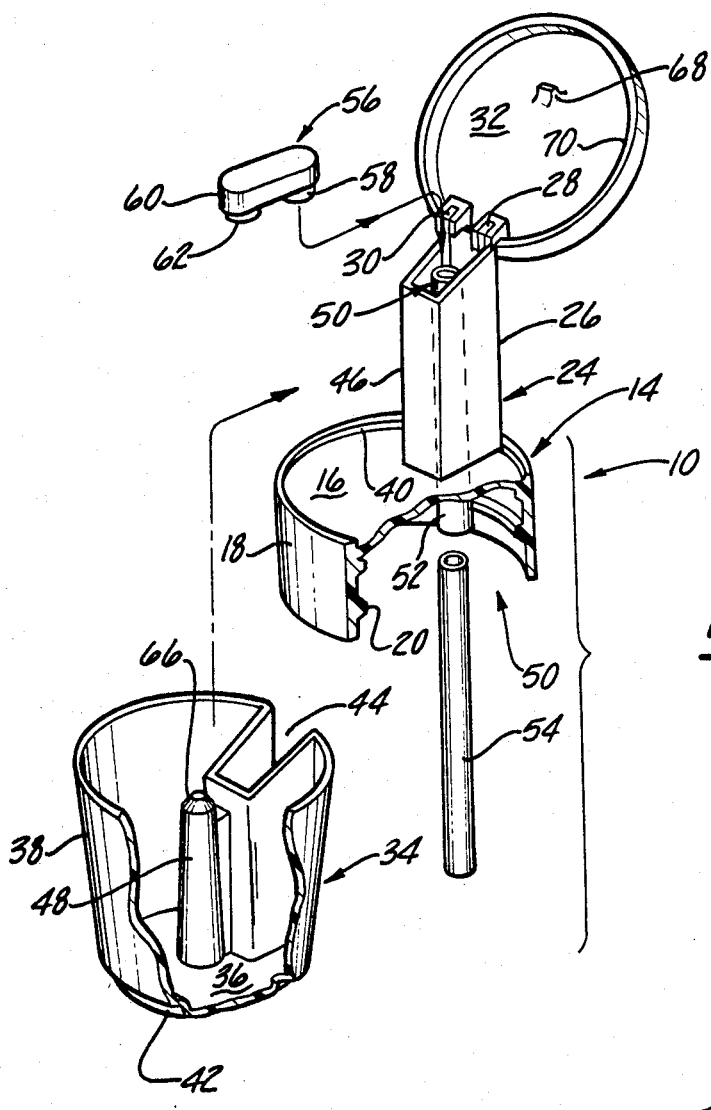
FIG. 3 is an exploded perspective view partially in section showing the assembly of the delivery tube, spout-valve and lid to the base cap, and the placement of the dosage cap thereon.

Referring to FIGS. 1 and 2, the dispensing closure 10 of the invention is shown in its assembled state as applied to a container 12, and in FIG. 3 it is shown in an exploded view depecting how the component parts are assembled. Base cap 14 has a top 16 and depending cylindrical skirt 18 which has means for attachment to the container 12 which is shown as internal screw threads 20 which mate with container threads 22. Other means can be provided for attachment to the container such as complementary snap beads. Formed integrally with cap 14 and extending upwardly from top 16 is pedestal 24 shown formed as a hollow interior housing which has an outside wall portion 26 which extends upwardly and is flush with the cylindrical skirt 18. A pair of hinge posts 28 extend upwardly from pedestal 26 to engage slots 30 formed in lid 32. This specific hinge structure is more clearly shown in U.S. patent application Ser. No. 664,553 filed Oct. 25, 1984 and owned by the common assignee of this application.

Dosage or metering cup 34 is molded as a separate unit having a bottom wall 36 and a vertical wall 38 conforming with the diameter of cap skirt 18. In the preferred embodiment, the base cap has a peripheral lip or rim 40 which acts to retain cup 34 placed thereon. Also, in a preferred form, the bottom of cup 34 is peripherally recessed as shown at 42 so that when the cup is placed on the base cap 14, the vertical cup wall 38 is flush with the cap skirt wall 18. Vertical cup side wall 38 is configured at 44 to conform with the inner side walls 36 of the pedestal housing 24. This provides a contiguous contact of configured cup side wall 44 and housing wall 46. A valve post 48 extends upwardly within cup 34 from bottom wall 36 adjacent or joined to housing recess 44.

In order to supply the fluid from container 12 to cup 34 a delivery tube 50 extends from the bottom of the container to adjacent the top of pedestal 24. This is conveniently formed as a conduit 52 molded integral with base cap 14 extending through cap top 16 upwardly within housing 24. A flexible dip tube 54 of a length suitable to reach the bottom of the container 14 is pushed over the bottom end of conduit 52 completing the delivery tube 50.

Figure 5:
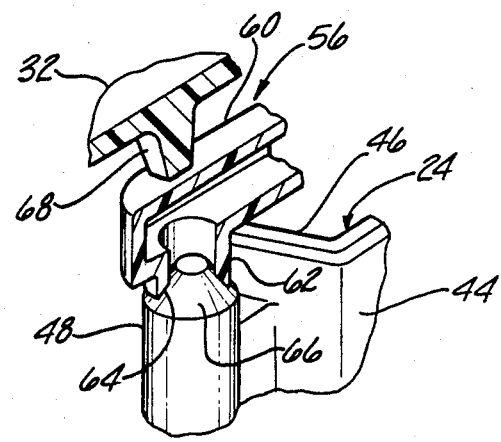
FIG. 5 is a fragmentary perspective view similar to FIG. 4 showing the spout in sealing relationship to the valve post.
Figure 4:
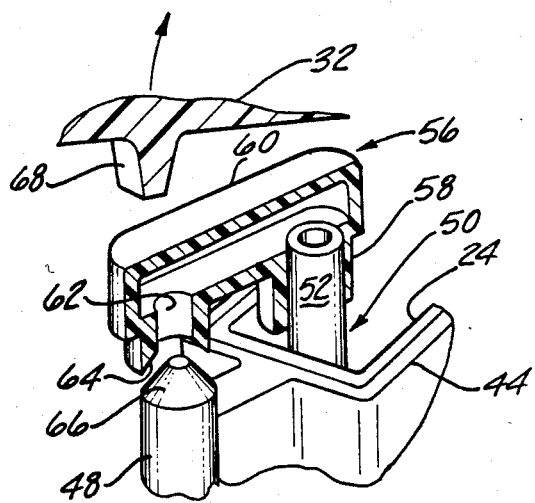
FIG. 4 is a fragmentary view in partial section showing the details of the spout attachment at one end of the upstanding liquid delivery conduit, with the lid open releasing the seal between the spout and the valve post showing the liquid flow path.

A separately molded spout-valve member 56 is formed with an inlet sleeve 58 which is pushed over the upper end of delivery conduit 52. Delivery channel 60 of spout member 56 spans the housing wall 46 and cup wall 44 to present a downwardly facing orifice 62 juxtapositioned above valve post 48. As shown in FIGS. 4 and 5, the orifice 62 and the top valve post 48 are formed with matching conical sealing surfaces 64 and 66 respectively. The lid 32 has a locking tab 68 projecting from its inside surface positioned to engage channel 60 of the spout-valve member 56 when the lid is closed. This pushes the conical sealing surface 64 of orifice 62 into sealing contact with conical sealing surface 66 at the top of valve post 48. This blocks any delivery of fluid from the container when the lid is in its closed position. Depending flange 70 on lid 32 engages the top of cup wall 38 retaining the lid in its closed position.

Figure 6:
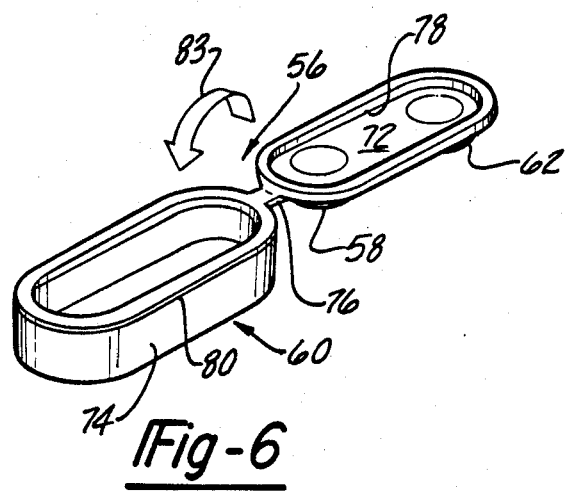
FIG. 6 is a perspective view of the spout-valve in the as molded position with an arrow showing the folding direction for assembly.
Figure 7:
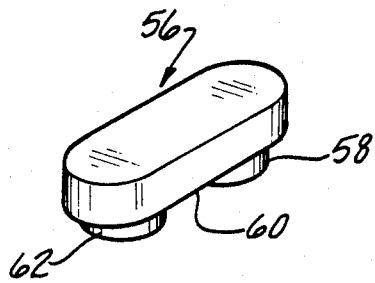
FIG. 7 is a perspective view of the spout-valve of FIG. 6 in the assembled condition for attachment to the delivery conduit.

FIG. 6 show the spout-valve member in an as-molded position in which it can be formed in one piece. Lid portion 72 is formed with the inlet sleeve 58 and outlet orifice 62 and is connected to the base portion 74 by a live hinge 76. The lid and base portions are formed with cooperating beads or undercuts 78 and 80, respectively, around the perimeters so that when the lid is folded over in the direction of arrow 83 and pressed onto the base, these beads snap over each other sealing the two halves together forming the unitary valve spout member 56 as it is shown in FIG. 7 for assembly to the closure as shown in FIG. 3.

Figure 8:
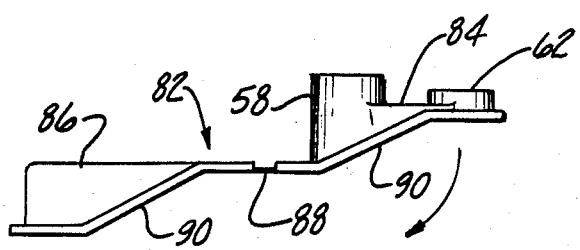
FIG. 8 is an elevational view of an alternate form of a spout-valve in its as molded position.
Figure 9:
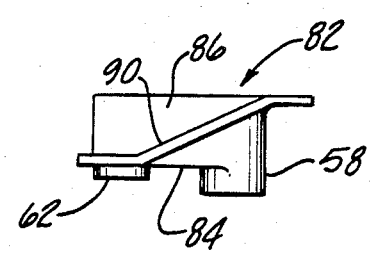
FIG. 9 is an elevational of the spout-valve of FIG. 8 in its assembled condition for attachment to the delivery conduit.
Figure 10:
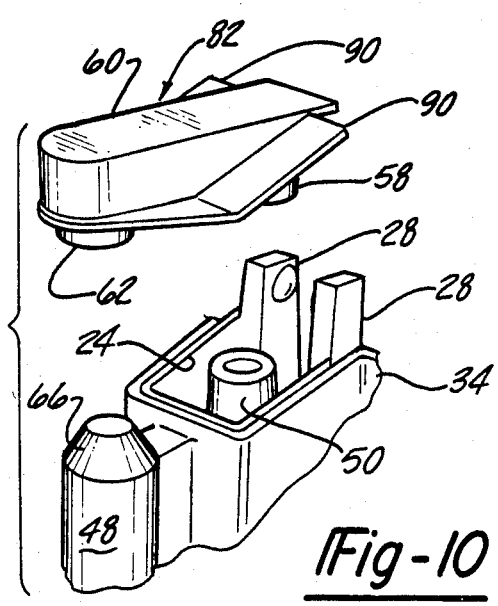
FIG. 10 is a partial perspective view showing the spout-valve of FIGS. 8 and 9 in position to be assembled to the delivery conduit and valve post of the closure base cap bridging the pedestal housing.

An alternate form of spout configuration having a deflecting cover is shown in FIGS. 8–10. FIG. 8 shows this alternate spout 82 in the as-molded position with its complementary sections 84 and 86 joined by live hinge 88, and FIG. 9 shows these complementary portions pushed together and sealed with complementary beads. Flange member 90 is molded integrally with spout 82 to form a lid or deflecting shield which is particularly useful when the lid 32 is open and the container is being squeezed delivering fluid through the spout 62 over valve post 48 into dosage cup 38. FIG. 10 shows the positioning of spout 82 relative to delivery conduit 52 and valve post 48.

The embodiments of the invention in which an exclusive property or privilege is claimed are defined as follows:

1. A liquid dispensing closure having a removable dosage cup and means for attachment to a flexible wall container comprising, in combination:
   a base cap having a top and a depending cylindrical skirt for attachment to said container;
   a pedestal extending upwardly from said cap top;
   a dosage cup removably seated on said cap top and having a side wall, said side wall being configured to receive said pedestal to provide a contiguous contact therewith;
   a closure lid hingingly connected to said pedestal for closure of said dosage cup; and
   a delivery tube extending downwardly from said cap top adapted to extend to the bottom of said container and extending upwardly from said cap top through and enclosed by said pedestal for delivery of liquid from said container to said dosage cup when said lid is in an open position and sealed from delivery when said lid is closed.

2. The liquid dispensing closure of claim 1 further including a valve post extending upwardly in said dosage cup and a spout-valve member attached to the upper end of said delivery tube, spanning said pedestal, and having an outlet orifice juxtaposition over the end of said valve post for cooperation therewith to an open position when said lid is open for delivery of liquid through said orifice and to a sealed position when said lid is closed.

3. The liquid dispensing closure of claim 2 wherein the orifice on said spout-valve member and the top of said valve post have complementary conical sealing surfaces.

4. The liquid dispensing closure of claim 3 further comprising a locking tab depending from the inside surface of said closure lid positioned to press against said spout-valve member when said lid is in a closed position pushing said conical sealing surfaces into closed sealing contact.

5. The liquid dispensing closure of claim 1 wherein said pedestal includes a hollow housing having an inside wall portion within the projected area of the base cap and an outside wall portion extending upwardly from the cylindrical skirt of said base cap and said dosage cup has a vertical wall portion contiguous with the inside wall portion of said housing and another vertical wall portion extending upwardly from the cylindrical skirt of said base cap, contiguous and forming with the outside wall portion of said housing a cylindrical extension of said skirt.

6. The liquid dispensing closure of claim 5 further including a valve post extending upwardly in said dosage cup and a spout-valve member attached to the upper end of said delivery tube spanning the inside wall portion of said housing and the vertical wall portion of said dosage cup with an outlet orifice in said spout-valve member juxtapositioned over the end of said valve post for cooperation therewith providing an open position when said lid is open for delivery of liquid through said orifice and providing a sealed position when said lid is closed.

7. The liquid dispensing closure of claim 1 wherein said base cap has a rim extending upwardly from said top and said dosage cup has a recess at its lower end for cooperative confinement with said rim to form a flush surface between said base cap skirt and said dosage cup.

8. A liquid dispensing closure having a removable dosage cup and means for attachment to a flexible wall container comprising, in combination:
   a base cap having a top and depending cylindrical skirt with means for attachment to said container;
   a pedestal housing extending upwardly from said cap top and having an inside wall portion within the area of said cap top and an outside wall portion extending upwardly and flush with said cylindrical skirt;
   a dosage cup removably seated on said cap top having a wall portion contiguous with the inside wall portion of said pedestal housing and an outside wall portion flush with and extending upwardly from said cap skirt to form with said outside wall portion of said housing a cylindrical extension of said skirt;
   a closure lid hingingly connected to the outside wall portion of said pedestal housing for closure of the top of said dosage cup and said housing;
   a delivery tube extending downwardly from said cap top adapted to extend to the bottom of said container and extending upwardly from said cap top through said pedestal housing;
   a valve post extending upwardly in said dosage cup;
   a spout-valve member attached to the upper end of said delivery tube and spanning said pedestal housing and dosage cup wall to provide a downwardly directed orifice juxtapositioned over the end of said valve post;
   and a locking tab depending from the inside surface of said closure lid positioned to press against said spout-valve member when said lid is in a closed position closing said orifice against the top of said valve post to prevent delivery of liquid therethrough, and upon opening of said lid, the lifting of said locking tab providing a free flow path for dispensing liquid from said container through said delivery tube and spout valve member out of said orifice and over said valve post to fill said dosage cup.

* * * * *